United States Patent
Cecchet

(10) Patent No.: US 11,087,609 B2
(45) Date of Patent: Aug. 10, 2021

(54) EMERGENCY MANAGEMENT METHOD COMPRISING A DEVICE FOR EMERGENCY CALLS

(71) Applicant: TRIC IT S.R.L., Milan (IT)

(72) Inventor: Marco Cecchet, Milan (IT)

(73) Assignee: TRIC IT S.R.L., Milan (IT)

( * ) Notice: Subject to any disclaimer, the term of this patent is extended or adjusted under 35 U.S.C. 154(b) by 0 days.

(21) Appl. No.: 16/765,213

(22) PCT Filed: Nov. 20, 2018

(86) PCT No.: PCT/IB2018/059127
§ 371 (c)(1),
(2) Date: May 19, 2020

(87) PCT Pub. No.: WO2019/102344
PCT Pub. Date: May 31, 2019

(65) Prior Publication Data
US 2020/0279466 A1    Sep. 3, 2020

(30) Foreign Application Priority Data

Nov. 21, 2017    (IT) .................. 102017000132981

(51) Int. Cl.
*G08B 23/00*    (2006.01)
*G08B 21/04*    (2006.01)
(Continued)

(52) U.S. Cl.
CPC ....... *G08B 21/0446* (2013.01); *G08B 21/043* (2013.01); *G08B 25/001* (2013.01);
(Continued)

(58) Field of Classification Search
CPC ................ G08B 21/0446; G08B 21/043; G08B 25/001; G08B 25/016; H04M 3/42348; H04M 3/44; H04M 11/04
See application file for complete search history.

(56) References Cited

U.S. PATENT DOCUMENTS 9,443,410 B1 * 9/2016 Constien ............ G08B 21/0446
10,304,310 B2 * 5/2019 Ten Kate ................ G08B 25/10
(Continued)

FOREIGN PATENT DOCUMENTS

WO    2009033228 A1    3/2009
WO    2013173079 A1    11/2013

*Primary Examiner* — Phung Nguyen
(74) *Attorney, Agent, or Firm* — Dickinson Wright PLLC

(57) ABSTRACT

An emergency management method comprising a device (1) for emergency calls and a central management information centre (30); said method comprises the steps of: recognizing a danger situation on the basis of processing of the signals provided by at least one movement sensor (13) and by a GPS module (11), positioned in said device (1); said step of recognizing a state of danger comprises the steps of: verifying a variation of the position obtained by said GPS module (11), verifying that the value of said at least one movement sensor (13) has exceeded a predefined limit; entering a state of attention if said checks are positive; said method, having recognized said state of attention, comprises the steps of: activating a timer for a first time; and if the position obtained by said GPS module (11) has not varied within said first time, and the value of said at least one movement sensor (13) is below a given predefined sensitivity threshold, within said first time, said method enters a state of alarm; said method in said state of alarm comprises the steps of: making a connection between said device (1) and said central information system (30); sending to said central information system (30) the data relative to identification of the owner of said device (1) and the position
(Continued)

Figure 1:
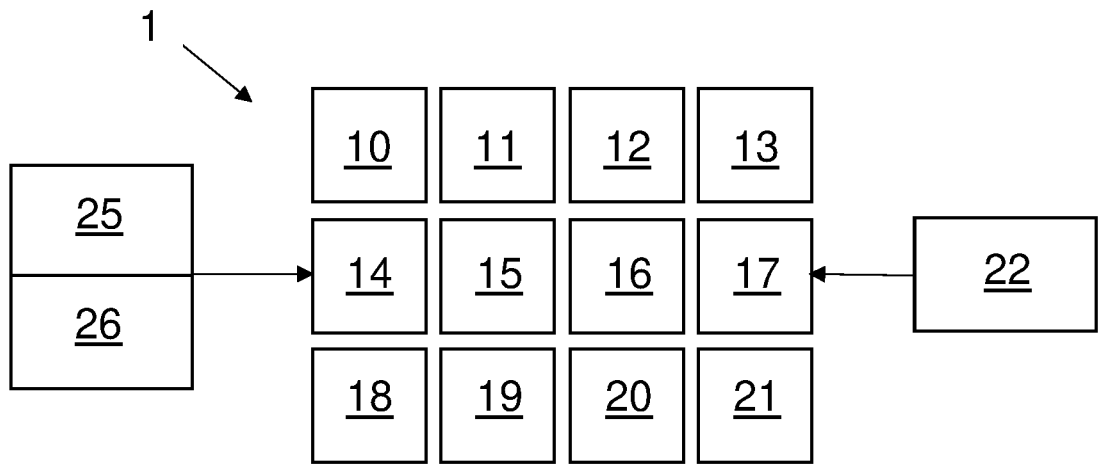

obtained by said GPS module (11); transferring the data relative to identification of the owner of said device (1) and the position obtained by said GPS module (11) from said central information system (30) to a private or public operator.

18 Claims, 2 Drawing Sheets

(51) Int. Cl.
<table>
<tr><td>G08B 25/00</td><td>(2006.01)</td></tr>
<tr><td>G08B 25/01</td><td>(2006.01)</td></tr>
<tr><td>H04M 3/42</td><td>(2006.01)</td></tr>
<tr><td>H04M 3/44</td><td>(2006.01)</td></tr>
<tr><td>H04M 11/04</td><td>(2006.01)</td></tr>
</table>

(52) U.S. Cl.
CPC ...... *G08B 25/016* (2013.01); *H04M 3/42348* (2013.01); *H04M 3/44* (2013.01); *H04M 11/04* (2013.01); *H04M 2201/14* (2013.01)

(56) References Cited

U.S. PATENT DOCUMENTS

| | | |
|---|---|---|
| 2009/0040052 A1 | 2/2009 | Cameron et al. |
| 2011/0098016 A1 | 4/2011 | Hatton |
| 2013/0197856 A1* | 8/2013 | Barfield ............... G01P 15/18 |
| | | 702/141 |
| 2013/0307685 A1* | 11/2013 | Sholder ............... G08B 21/02 |
| | | 340/539.12 |
| 2014/0292510 A1* | 10/2014 | Cholhan ............ H04W 4/021 |
| | | 340/539.13 |
| 2014/0327540 A1* | 11/2014 | Shin ................. G08B 25/006 |
| | | 340/539.11 |
| 2015/0145662 A1 | 5/2015 | Barfield |
| 2016/0210838 A1* | 7/2016 | Yan ................... G08B 25/001 |
| 2016/0220153 A1* | 8/2016 | Annegarn .......... G08B 21/0446 |
| 2019/0156655 A1* | 5/2019 | Cordes ............. G08B 21/0423 |

* cited by examiner

EMERGENCY MANAGEMENT METHOD COMPRISING A DEVICE FOR EMERGENCY CALLS

FIELD OF THE INVENTION

The present invention refers to an emergency management method comprising a device for emergency calls.

BACKGROUND

The practice of individual sports is constantly increasing in Europe and the United States. At the same time, an increase in sports injuries has been recorded, due to falls, collisions and impacts which, in some cases, lead to death of the person involved due to delay in or impossibility of calling for help in time.

Extreme sports apart, even the commonest daily activities can result in emergency conditions which, if not dealt with in time, have serious consequences.

SUMMARY

The object of the present invention is to provide an emergency management method comprising a device for emergency calls which is versatile.

In accordance with the present invention, said objects and others yet are achieved by a method according to claim 1.

Further characteristics of the invention are described in the dependent claims.

This solution has various different advantages compared to the solutions of the known art.

It consists of a device for emergency calls, based on GSM technology, readily available to the user if he/she is in a danger situation.

The user can rely on the possibility of making an emergency call by means of a very simple and dependable device, dedicated and specialized for this purpose and, furthermore, provided with numerous satellite positioning sensors.

The device is able to enhance communication with the public emergency operators, by means of an initial voice message addressed to them, containing important information on the caller, on his/her current position and on the danger situation.

The device is designed to operate by association with any GSM network, and its mode of interaction does not require the operator receiving the call to have previous training or be equipped with information technology tools.

The voice message contains all the information available to the device and is presented in a rational orderly manner to the operator answering the emergency call.

In the case of basic interaction, the universal public emergency number 112 is contacted and the automatic preliminary voice message generated is presented to the operator.

If, on the other hand, the user has stipulated a support contract with a private operational centre, and the operator therefore belongs to this support centre, the latter can communicate via the device with the user and with a third respondent (teleconference), i.e. typically the public operator of the emergency number 112, routing the second call by means of the same device.

The entire operation of the devices is mediated by a central information service, preferably in cloud, which has numerous functions including, by way of non-limiting example, generation of the voice messages, management of opening and closing of the telephone calls, management of administrative and user information including information that can be managed by a user application or an operator application, and other applications.

The user can rely on the possibility of carrying out an emergency signalling by means of a very simple and dependable device, dedicated and specialized for this purpose.

The device is able to ensure that help reaches the accident site faster than the normal communication means available on the market.

The device can be provided with various algorithms, each dedicated to one of the sports for which the device has been designed, able to monitor the data generated during the sports activity, in real time.

Via the sensors, the algorithms control the dynamic action of the users during the sports activity, by detecting critical and dangerous events.

In the event of a serious fall or collision, an automatic emergency call is forwarded after a few seconds of inactivity of the wearer.

The device is automatically activated, but the request for help can also be sent manually by the user pressing the button positioned in the centre of the device, also to request help on behalf of other persons with him/her.

BRIEF DESCRIPTION OF THE DRAWING FIGURES

Figure 2:
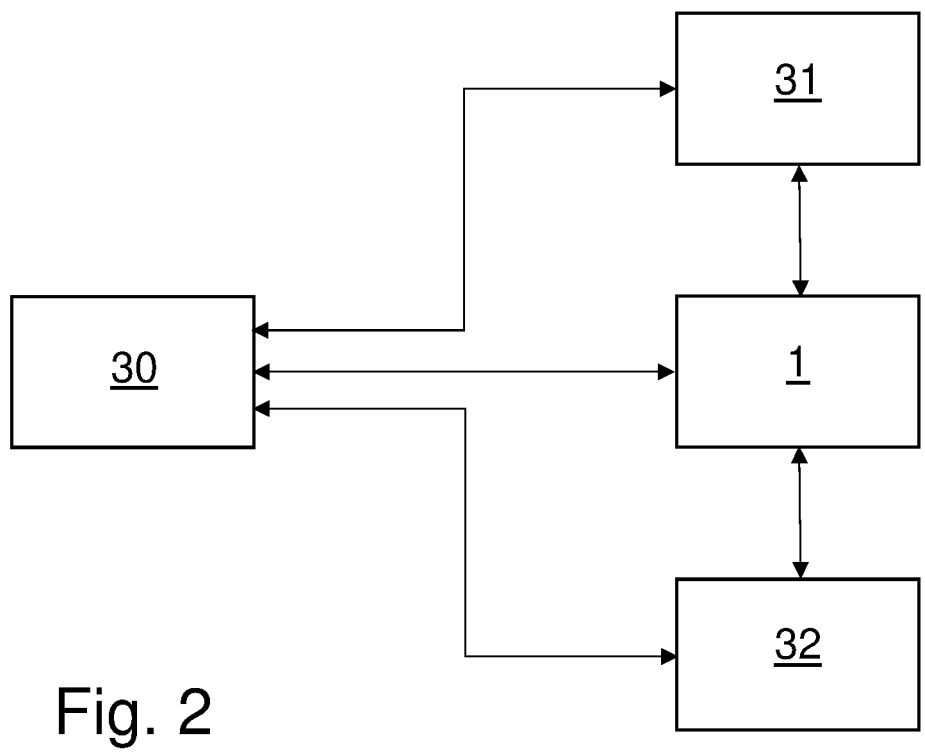
Figure 3:
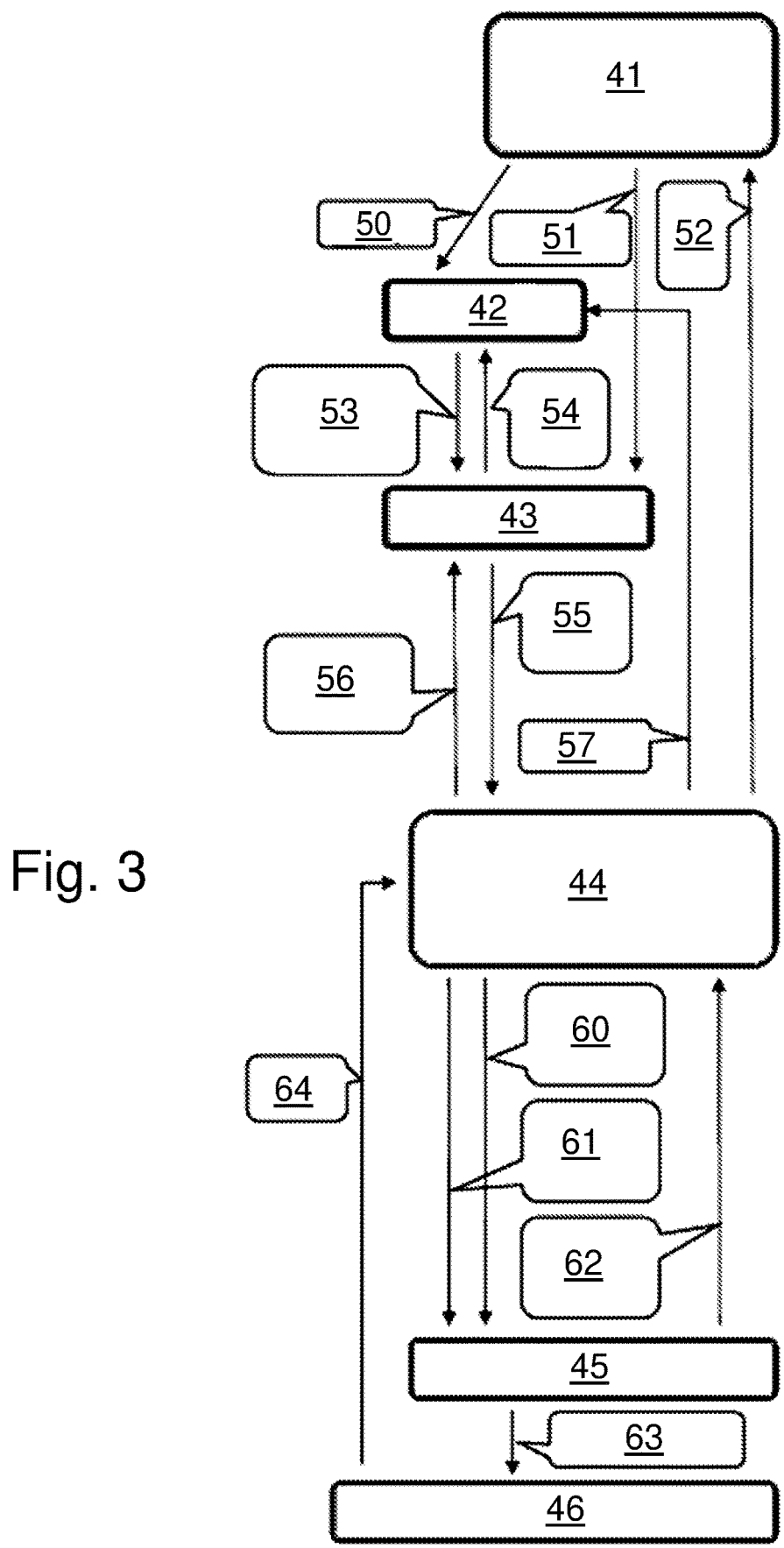

The characteristics and advantages of the present invention will be evident from the following detailed disclosure of a practical embodiment thereof, illustrated by way of non-limiting example in the attached drawings, in which:

FIG. 1 schematically shows a device for emergency calls, according to the present invention;

FIG. 2 schematically shows an emergency management system comprising a device for emergency calls, according to the present invention;

FIG. 3 shows a flow diagram illustrating various operating states of a device for emergency calls, according to the present invention.

DETAILED DESCRIPTION

Referring to the attached figures, a device for emergency calls 1, according to the present invention, comprises a GSM communication module 10 preferably with simultaneous call support in conference call; a GPS module 11; a Bluetooth module 12; MEMS sensors 13, for example accelerometer, gyroscope, magnetometer; a button 14; a memory 15; a DTMF tone receiver/transmitter 16; a vibration unit 17; an RGB led 18; a microphone 19; a loudspeaker 20; preferably a temperature sensor 21; a microprocessor 22; a battery 25; a battery recharge module 26 all enclosed in an IP67 or IP68 waterproof container with at least IK10 impact resistance.

The device for emergency calls 1 has a large button 14 which is comfortable and has good tactile feedback. It has a clearly visible multicolour led 18 which communicates the various states by the speed at which it flashes and the change of colour; for reasons of consumption, it is never on in fixed mode but communicates its status by flashing and changing colour; to communicate the status, it also uses a vibration unit 17. The device 1 is recharged by means of a contactless recharge system, but also has two external metal contacts capable of recharging if the contactless system is not available. It is also provided with a Bluetooth module 12, for communication with mobile phone applications, but also for communication with other devices such as speakerphone, smart watches and others. The microphone 19 and the loudspeaker 20 enable the device 1 to operate as a speakerphone. It also comprises a microprocessor 22 for management of all the modules making up the device 1.

The electric circuit is not described in detail since a person skilled in the art would be able to produce it from the following explanation of the various functions of the elements listed above.

The emergency system, of which the device 1 for emergency calls forms a part, comprises a central information system 30, preferably in cloud, a possible information interface 31, based on WEB technology, and a possible further interface 32, of the mobile phone application type.

The device 1 comprises 6 possible operating states, defined as "Shipment/Airplane Standby" 41, "Charging Standby" 42, "Sleep Standby" 43, "Working mode" 44, Pre-alarm mode" 45, "ALARM mode" 46.

The main states are "sleep standby" 43 and "working mode" 44.

In the "Shipment/Airplane Standby" state 41, the device 1 is completely switched off. It goes to state 42 if it is put under charge 50, or goes 51 to state 43 if it is switched on, and returns to state 41 if forced 52 by the button 14 or by a smartphone application.

In state 42 it is still completely switched off and the yellow led 18 comes on indicating that it is under charge and only the recharge is controlled.

From state 42 it goes 53 to state 43 if the device 1 has been completely charged, and returns there 54 if it has to be recharged.

In state 43 the green led 18 flashes, the sensors rarely come on (once a day) and the battery charge status is controlled.

From state 43 it goes 55 to state 44 if the device is moved and returns there 56 if it remains at a standstill for at least 15 minutes. From this state 44 it goes 57 to state 42 if it has to be recharged.

In state 44 the led 18 flashes red if the device 1 has to be recharged or cannot connect to the GSM line, flashes yellow if the charge of the battery 25 is low and is connected to the GSM line, flashes green if the battery 25 is charged and is connected to the GSM line. The sensors 13 are on. The GSM 10, the GPS 11 and the Bluetooth 12 are on.

The state 44 goes 60 to the state of pre-alarm or attention 45 if the button 14 is pressed, or goes 61 to state 45 if a dedicated algorithm detects a state of alarm. It returns 62 to state 44 if the alarm has been cancelled by the user by means of the button 14.

The state 45 goes 63 to state 46 if a predefined time from when the device 1 is in the state of attention 45 is exceeded. It returns to state 44 upon termination of the alarm.

In state 45 the led 18 flashes yellow and green and in state 46 it becomes green, all the sensors 13 are on, and also the GSM 10, the GPS 11 and the Bluetooth 12 are on.

In state 44 "working mode" three different settings are possible, programmable by means of a mobile phone application, with three different levels of current consumption to increase the battery duration.

In the base level the GSM system is always on, the GPS system continuously searches for the connection, periodically saving in memory the coordinates detected and the sensor analysis algorithm is constantly active. In this mode, the real operating duration target is around 24 hours non-stop. This operating mode allows tracking of the device both in almost real time, saving the coordinates detected, and above all an immediate communication of the state of alarm to the central systems.

In the low consumption level the GSM and GPS sections are activated only periodically to verify the actual availability of GSM cover and GPS signal, to save the coordinates detected. By way of example only, in terms of timescales, switch-on for 60 seconds every 20 minutes could be scheduled for the GSM and, again by way of example, for the GPS section, every 10 minutes only for the seconds strictly necessary to obtain a valid GPS signal. Furthermore, only every n hours of use in this mode, a connection would be created with the central information system 30 for verification and synchronization of the information between the device 1 and said system 30.

The objective in this mode is to achieve many days of autonomous use without needing to recharge the battery.

Given the very low consumption level, the main internal devices are permanently switched off.

The coordinates are not periodically detected and stored. However, at least once every 24 hours in this mode a GPS signal will be searched for and a GPRS communication opened by switching the GSM section on, synchronizing the information between the device 1 and the central information system 30. The objective in this mode is to achieve an autonomy of many weeks of use without needing to recharge the battery.

The device 1 must be switched on by the user before use, for example by pressing the button 14 for two seconds.

It then issues a switch-on feedback to the user, causing the led 18 to flash rapidly in red. A brief vibration will be emitted as a further confirmation.

Following this, the device 1 determines the charge status of its battery.

If the charge status is below 40%, a long additional vibration is emitted warning the user of the danger due to the limited charge.

The device 1 will in any case emit a further periodic vibration when the remaining charge is below 20% and below 10%.

Having performed the battery test, the device 1 begins to acquire the GPS signal 11, and stores the date, the time and the coordinates of the GPS. The user is notified by means of the led 18. The above rapid red flashing becomes much slower and yellow if the acquisition is poor, and green if good.

In the event of loss of the GPS signal, the last coordinates are stored.

In the event of loss of the signal for over 120 seconds, the led will flash red in rapid mode.

The point recording interval is defined dynamically according to the movement speed and memory available within the device. In the event of insufficient memory, the data already collected will be appropriately and progressively aggregated so as to make space for new data.

In parallel the device 1 switches on the GSM module 10 and verifies the list of GSM operators available; the code and nationality of the operator with loudest signal and information on the other operators are verified and stored. If there is no GSM operator available, the led 18 is forced to flash rapidly in red independently of the other states of the device 1 and the GSM module 10 is temporarily switched off.

If the device 1 is outside the GSM coverage, it nevertheless maintains the GPS module 10 switched on and relative local storage of the coordinates until the device 1 is switched off by the user.

If the verification of GSM coverage has a positive outcome, connection to the operator will be attempted in order to assure that the service availability towards that operator is certain.

The subsequent GSM verification is carried out after 15 minutes or if the total movement detected by the GPS module 10 is greater than 2000 m.

In both the cases (positive and negative) between one verification and another the GSM module 10 will be switched off in order to minimize energy use.

At each variation in the presence of GSM cover, a short notification vibration is emitted and flashing of the led changes (rapid red if outside cover, slow if within GSM cover, slow green or slow yellow depending on the quality of the GPS signal as defined above).

The user can switch the device 1 off by briefly pressing the button of the device 6 times or more within the space of 15 seconds. When this happens, the device 1 generates a long switch-off vibration and switches off its internal circuits and the led.

The device 1 has two operating modes, the first in a case of basic interaction where the user has not signed a support contract with an operating centre, and the second where the user has signed a support contract.

In the first case the notification of an alarm condition is routed to the central information system 30 by means of GPS and GPRS connection if available, otherwise by means of SMS.

The alarm and user identification data will be handled by the central information system 30, which will generate a preliminary voice message in the most appropriate language according to the geographical position of the device 1. A compact URL will also be generated where optionally a remote operator can view the information available on a common web browser.

In the preliminary voice message all said information possessed is provided for management of the alarm, for example first name, surname, age, particular illnesses of the person, information on the position and the compact URL and, if available, information relative to the type of danger.

At this point the central information system 30 will send an order to the device 1 to make a voice call to the local public emergency service (for example 112 or 911) and when the public service responds, the three-way conversation function (conference call) will be activated. At this point, the central information system 30 will send the preliminary voice message, which can also be heard by the user of the device in the field, and, with appropriate additional messages in the local language, will enable the operator, even without specific training, to recall the sections of the message using his/her DTMF phone keypad. In particular the operator will be able to request the compact URL for accessing the web page if useful for management of the case. Once the important initial part with the preliminary voice message has been concluded, the service will automatically activate the speakerphone with the device in the field, so that the operator can make direct contact with the user for all necessary checks.

During the speakerphone phase, the operator can at any time re-listen to the entire preliminary voice message or a part of it (for example dictation of the compact URL, etc.) by means of the DTMF tones. The operator is periodically reminded of this possibility by brief voice messages generated by the central information system 30 if a conversation is not in progress (revealed by the absence of important signals on the microphone and on the loudspeaker of the device).

To allow the interaction by means of DTMF tone keypad, clear and simple voice instructions will be added for the operator regarding which phone key to press to re-listen to the component messages of the preamble, for example key 1 to hear the identity of the caller, 2 to hear the coordinates of the position of the caller or the compact URL for access from browser, 3 to change language, 4 to activate the speakerphone function, 5 to add the public emergency service 112 to the call or others for activating the other functions scheduled by the system.

Alternatively to the call to the local public emergency service, the user, via prior programming, is free to modify or even select the entire list of numbers, therefore leaving only private numbers if necessary, at his/her discretion and under his/her own responsibility (friends, relatives or private emergency services which the user may independently select). The option of allowing the user to enter further telephone numbers is desirable also to provide a communication path alternative to the one to the local public service, which in some circumstances (or geographical areas) may not be available or effective, or if the GSM network does not allow (for technical reasons) creation of the three-way call in order to contact a local public service. The calls to specific numbers, entered by the user, can in fact be routed directly to the central information system 30 without having to go back through the device in the field: in this case it is the central information system 30 that manages the three-way call function and not the device in the field.

In the second case, the alarm notification is given by the device to the central information system 30. In order to send the alarm notification, the device obviously needs to have, at that moment, a GSM connection able to send the alarm notification provided with the appropriate identification data of the device, the coordinates and everything required by the central information system 30 to send, by means of a specific application, a complete alarm notification to the operator under contract.

If the device does not have a sufficient GPRS connection to send the alarm data, it will resort to simultaneously sending an SMS containing the base data, appropriately compacted, which can be interpreted by the central information system 30 and in parallel a GSM call to the telephone number dedicated to the service at the central information system 30, to which the identification code of the device and the base information on the alarm situation would be transferred by means, for example, of a sequence of DTMF tones appropriately organized in a communication protocol.

Having interpreted these data, the central information system 30 will send the notification on the web application to the most suitable operator.

At this point the operator will take charge of the signalling and will follow the intervention plan procedure (which may have significant differences, depending on the various users and acquirable premium profiles).

The intervention may, for example, entail an attempt to make a first voice call to the device in the field for verification purposes; following the checks, the operator can request the device in the field to make a second voice call to a local public emergency service (for example 112 or 911). The second call can establish communication only between the public operator and the private operator and the latter will be able, again via the web application interface, to bring the user in the field into the conversation, if useful, by activating the device speakerphone.

The private operator can recall on the map the current position, routes covered, complete user details etc. and communicate them to the public operator.

Furthermore, the private operator will always have a compact URL available on its terminal which it can, at its discretion, dictate to the public operator; the latter, if provided with web browser, can display the web interface with all the important information for best organization of the intervention.

The preliminary voice message is not necessary and is not used in this mode.

The central information system 30, preferably in cloud, is the set of information services, also with telephone interface, for management of both the administrative/technical aspects, for example user accounts, profiles, payments, recharges, updates, services etc. and the operational aspects, for example composition and reading of the voice messages in the correct language, DTMF tone interaction, management of voice calls to the appropriate respondents, whether in private operational centres or, where applicable, persons appointed by the user, and management of additional calls by the device to public operators like 112.

It contains the modules for interfacing and presentation of the data to the advanced interfaces and manages creation and distribution of the URL addresses for access to the WEB interfaces.

It manages the communication, usable content and configurations of the final user interface.

Inside, it is able to decode the DTMF tones, synthesize voice messages by means of text to speech technologies, compose voice messages on the basis of recorded messages and act accordingly to operator requirements, in various languages, according to the market in question.

In addition to the manual activation, activated by the user pressing the button, the device 1 continuously monitors the signals coming from its own internal sensors and then automatically forwards a call if all the conditions defined by one or more activated algorithms have occurred.

One of the simplest algorithms installed as standard on the device, is the following.

Initial activation of the device has been successful and the GPS position has not varied in the last few minutes, i.e. the user is motionless, and the movement sensors report that in the last few minutes the device/user has undergone a sudden variation exceeding a given predefined sensitivity threshold, confirming that the user has sustained an impact and indicating that something has happened to the user.

If all the conditions have been verified, the device emits an alert voice message three times in which imminent notification to the emergency management centre is announced in advance, followed by a continuous emission of an alarm tone for at least 2 minutes.

The user has this period of time to interrupt the alarm by pressing the key for at least one second; if this does not occur, the device makes the emergency call.

The aim is to activate a state of attention, for example in the case of trekking, with regard to a significant impact, and to confirm the alarm status if the person in question does not start moving again in the following few minutes. The algorithm is designed to avoid false alarms.

In greater detail, the algorithm provides for constant detection of the acceleration and rotation signals and calculation of the parameters deriving from it such as the acceleration modulus, the rotation speed modulus, the impact force, the weighted average of the acceleration, and an index of the acceleration modulus variance.

The values measured are compared with the predefined threshold values which, for example, can vary with variation in the sport practised and set in the device. For example, the acceleration threshold values and the wait times can be higher for sports involving greater movement.

Even if only one value exceeds its threshold value, the pre-alarm can be activated or a risk "score" is calculated according to which alarm level is chosen.

The algorithm enters the pre-alarm state, but nothing is highlighted or communicated, in order to avoid false alarms.

A timer is activated for the calculation of a first time $\Delta t1$.

If within the time $\Delta t1$ the activity is resumed normally (i.e. if the GPS module shows a variation in position and/or the values coming from the sensors and/or their processing drop back below the threshold values, for example if the weighted average of the acceleration modulus and its variance are within the limits) the device 1 quits the pre-alarm status, otherwise the situation is monitored preferably for a second time $\Delta t2$, and if everything is within the normal limits, the algorithm resumes normally.

If during the second time $\Delta t2$ the activity is interrupted, i.e. the mean and variance values tend to zero, the alarm status is confirmed, otherwise it resumes normally.

The device can, by updating of the firmware, add further recognition algorithms or different intervention thresholds for the various danger situations.

These algorithms can tend to the identification of danger situations for which a so-called valid and reliable protocol is identified by the designers for the sports practised by the user.

The result could be a more rapid and reliable detection of an alarm situation with respect to the emission of an automatic alarm as previously illustrated.

In the event of alarm activation (both via button and automatically) the device will notify that it has entered alarm status by flashing of the red led and by intermittent vibration.

In this status the user will have 60 seconds, configurable, to interrupt sending of the alarm. Cancellation is performed via the same procedure that serves to switch off the device (button pressed rapidly 6 times in the space of 15 seconds). The effect of this sequence, if applied during the alarm status, does not obtain switch-off of the device but cancellation of the alarm status.

In order to manage and program the device, an application for computer and/or for mobile phone is used which communicates with the device by means of Bluetooth, for example.

The system preferably comprises a mobile phone application. The object of the application is to allow customization and configuration of the device both in terms of operating modes and user details, details to be included in the preliminary voice message of the emergency call, details relative to the user profile, costs, fees for the active services, renewals, and services renewal monitoring.

It is possible to download the path and times of the last activity recorded (tracking) via the application. The preferences relative to the activity tracking function can be set. It allows graphic display of the activity carried out on a map, updating of the firmware and the management of any additional software plug-ins, for example the algorithms for analysis of the signals and automatic determination of the alarm conditions.

The device can also communicate via Bluetooth, as an optional possibility available to the user, with the most commonly used sports watches.

Again the device can connect to the standard speakerphone devices via Bluetooth.

Therefore, the device is activated when it recognizes an alarm condition by analysis of the sensor signal, or when the user presses the button.

The user has a fixed time to abandon the alarm process via the button.

The device makes use of the central information system to generate the voice message and call the public service 112.

The operator can switch to a web browser or continue with the DTMF tones, or alternatively communicate with a private emergency centre under contract.

The device can also use the voice access to contact in combination or alternatively other persons predefined as family or other private support.

The private operator can send an emergency call to the public emergency service, involving the user in conference call.

The public emergency centre can directly send the emergency personnel, based on the information received from the device.

The invention claimed is:

1. An emergency management method comprising a device (1) for emergency calls and a central management information centre (30); said method comprises the steps of: recognizing a danger situation on the basis of processing of the signals provided by at least one movement sensor (13) and by a GPS module (11), positioned in said device (1); said step of recognizing a state of danger comprises the steps of: verifying a variation of the position obtained by said GPS module (11), verifying that the value of said at least one movement sensor (13) has exceeded a predefined limit and entering a state of attention if positive; said method, having recognized said state of attention, comprises the steps of: activating a timer for a first time; and if the position obtained by said GPS module (11) has not varied within said first time, and the value of said at least one movement sensor (13) is below a given predefined sensitivity threshold, within said first time, said method enters a state of alarm; said method in said state of alarm comprises the steps of: making a connection between said device (1) and said central information system (30); sending to said central information system (30) data relative to identification of an owner of said device (1) and the position obtained by said GPS module (11); transferring data relative to identification of the owner of said device (1) and the position obtained by said GPS module (11) from said central information system (30) to a private or public operator, wherein, before the step of making the connection between said device (1) and said central information system (30), said method comprises the step of activating the timer for a second time; if the position obtained from said GPS module (11) has not varied within said first time, and the value of said at least one movement sensor (13) is below the given predefined sensitivity threshold, within said first time, said method enters the state of alarm.

2. The method in accordance with claim 1 characterized in that said central information system (30) sends to said private or public operator a preliminary voice message comprising the information of said danger situation and sends data relative to identification of the owner of said device (1), and the last data received from said GPS module (11).

3. The method according to claim 1 characterized in that said central information system (30) will send an order to the device (1) to make a voice call to a local public emergency service and upon the reply of said public service a three-way conversation function will be activated.

4. The method according to claim 3 characterized in that said device (1) comprises a DTMF tone receiver/transmitter (16) and during the three-way conversation phase, the public service operator can, at any moment, listen again to the entire preliminary voice message or a part thereof by means of DTMF tones.

5. The method according to claim 1 characterized in that said central information system (30) sends to said private or public operator a URL address with which said private or public operator can connect and obtain the information concerning said danger situation, the data relative to identification of the owner of said device (1), and the last data received from said GPS module (11).

6. The method according to claim 1 characterized in that said central management information system (30) is in a cloud.

7. The method according to claim 1 characterized in that said at least one movement sensor (13) comprises an accelerometer, a gyroscope and a magnetometer.

8. The method according to claim 7 characterized in that said microprocessor (22) receives the data from said accelerometer, gyroscope and magnetometer; calculates parameters deriving therefrom including an acceleration modulus, a rotation speed modulus, an impact force, a weighted average of the acceleration, and an index of the acceleration modulus variance; compares the parameters calculated with respective predefined threshold values; and, even if only one single value exceeds the respective predefined threshold values, said device (1) enters the state of attention.

9. The method in accordance with claim 1 characterized in that said device (1) further comprises a microphone (19) and a loudspeaker (20) enabling it to operate like a speakerphone.

10. An emergency management method comprising a device (1) for emergency calls and a central management information centre (30); said method comprises the steps of: recognizing a danger situation on the basis of processing of the signals provided by at least one movement sensor (13) and by a GPS module (11), positioned in said device (1); said step of recognizing a state of danger comprises the steps of: verifying a variation of the position obtained by said GPS module (11), verifying that the value of said at least one movement sensor (13) has exceeded a predefined limit and entering a state of attention if positive; said method, having recognized said state of attention, comprises the steps of: activating a timer for a first time; and if the position obtained by said GPS module (11) has not varied within said first time, and the value of said at least one movement sensor (13) is below a given predefined sensitivity threshold, within said first time, said method enters a state of alarm; said method in said state of alarm comprises the steps of: making a connection between said device (1) and said central information system (30); sending to said central information system (30) data relative to identification of an owner of said device (1) and the position obtained by said GPS module (11); transferring data relative to identification of the owner of said device (1) and the position obtained by said GPS module (11) from said central information system (30) to a private or public operator, wherein said central information system (30) will send an order to the device (1) to make a voice call to a local public emergency service and upon the reply of said public service a three-way, conversation function will be activated.

11. The method in accordance with claim 10 characterized in that said central information system (30) sends to said private or public operator a preliminary voice message comprising the information of said danger situation and sends data relative to identification of the owner of said device (1), and the last data received from said GPS module (11).

12. The method according to claim 11 characterize in that said device (1) comprises a DTMF tone receiver/transmitter (16) and during the three-way conversation phase, the public service operator can, at any moment, listen again to the entire preliminary voice message or a part thereof by means of DTMF tones.

13. The method according to claim 10 characterized in that said central information system (30) sends to said private or public operator a URL address with which said private or public operator can connect and obtain the information concerning said danger situation, the data relative to identification of the owner of said device (1), and the last data received from said GPS module (11).

14. The method according to claim 10 characterized it said central management information system (30) is in a cloud.

15. The method according to claim 10 characterized in that said at least one movement sensor (13) comprises an accelerometer, a gyroscope and a magnetometer.

16. The method according to claim 15 characterized in that said microprocessor 22) receives the data from said accelerometer, gyroscope and magnetometer; calculates parameters deriving therefrom including an acceleration modulus, a rotation speed modulus, an impact force, a weighted average of the acceleration, and an index of the acceleration modulus variance; compares the parameters calculated with respective predefined threshold values; and, even if only one single value exceeds respective predefined threshold values, said device (1) enters the state of attention.

17. The method according to claim 10, wherein before the step of making a connection between said device (1) and said central information system (30), said method comprises the step of activating the timer for a second time; if the position obtained from said UPS module (11) has not varied within said first time, and the value of said at least one movement sensor (13) is below the given predefined sensitivity threshold, within said first time method enters the state of alarm.

18. The method in accordance with claim 10 characterized in that said device (1) further comprises a microphone (19) and a loudspeaker (20) enabling it to operate like a speakerphone.

* * * * *

UNITED STATES PATENT AND TRADEMARK OFFICE
CERTIFICATE OF CORRECTION

PATENT NO. : 11,087,609 B2
APPLICATION NO. : 16/765213
DATED : August 10, 2021
INVENTOR(S) : Marco Cecchet Page 1 of 1

It is certified that error appears in the above-identified patent and that said Letters Patent is hereby corrected as shown below:

In the Claims

Column 11, Claim 16, Line 21: please replace "22)" with -- (22) --

Column 12, Claim 17, Line 13: please replace "UPS" with -- GPS --

Column 12, Claim 17, Line 16: please replace "first time method" with -- first time, said method --

Signed and Sealed this
Twenty-sixth Day of October, 2021

Drew Hirshfeld
*Performing the Functions and Duties of the
Under Secretary of Commerce for Intellectual Property and
Director of the United States Patent and Trademark Office*